July 29, 1924.
S. L. BAILEY.
SADDLE
Filed Sept. 19, 1922   2 Sheets-Sheet 2
1,502,975
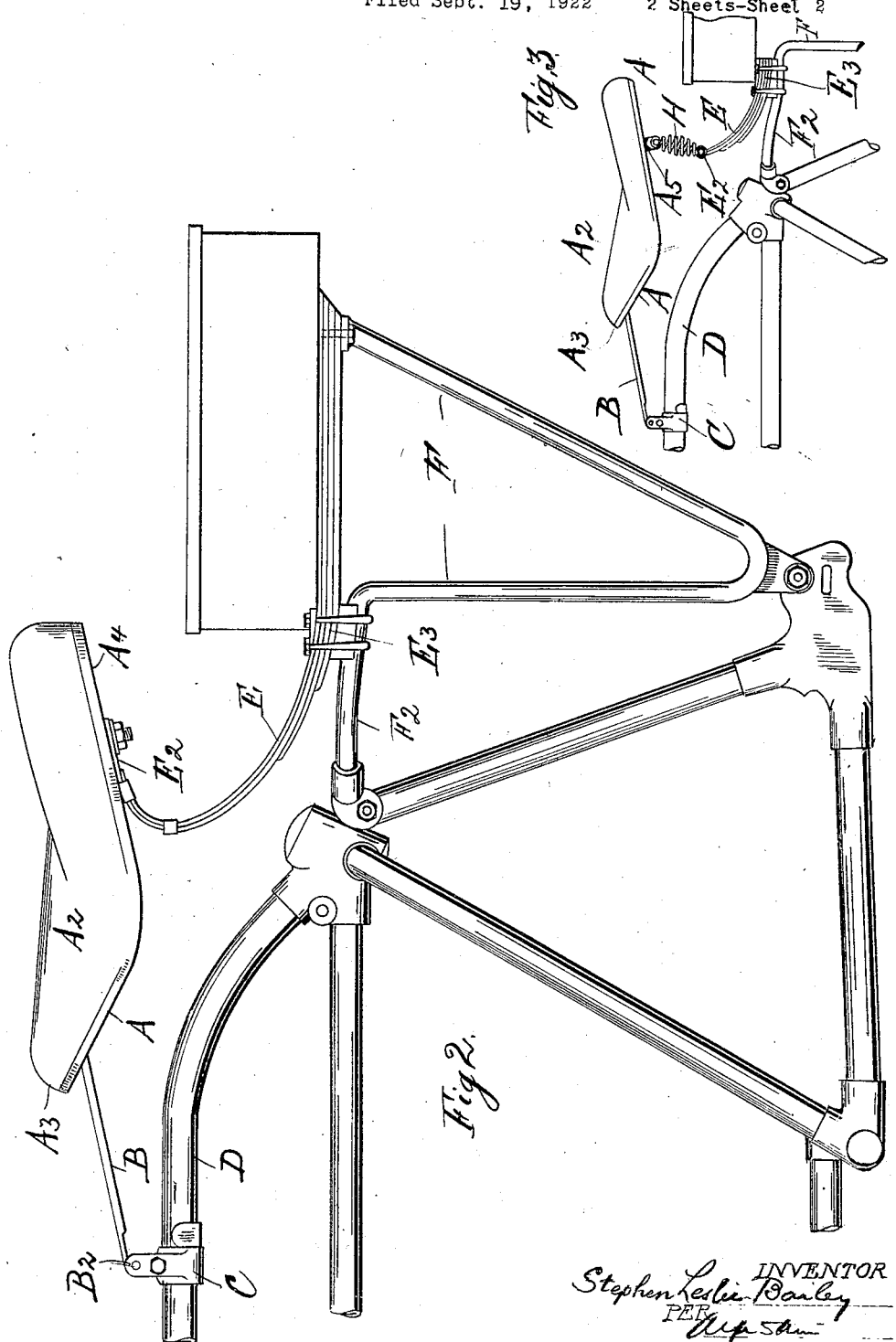

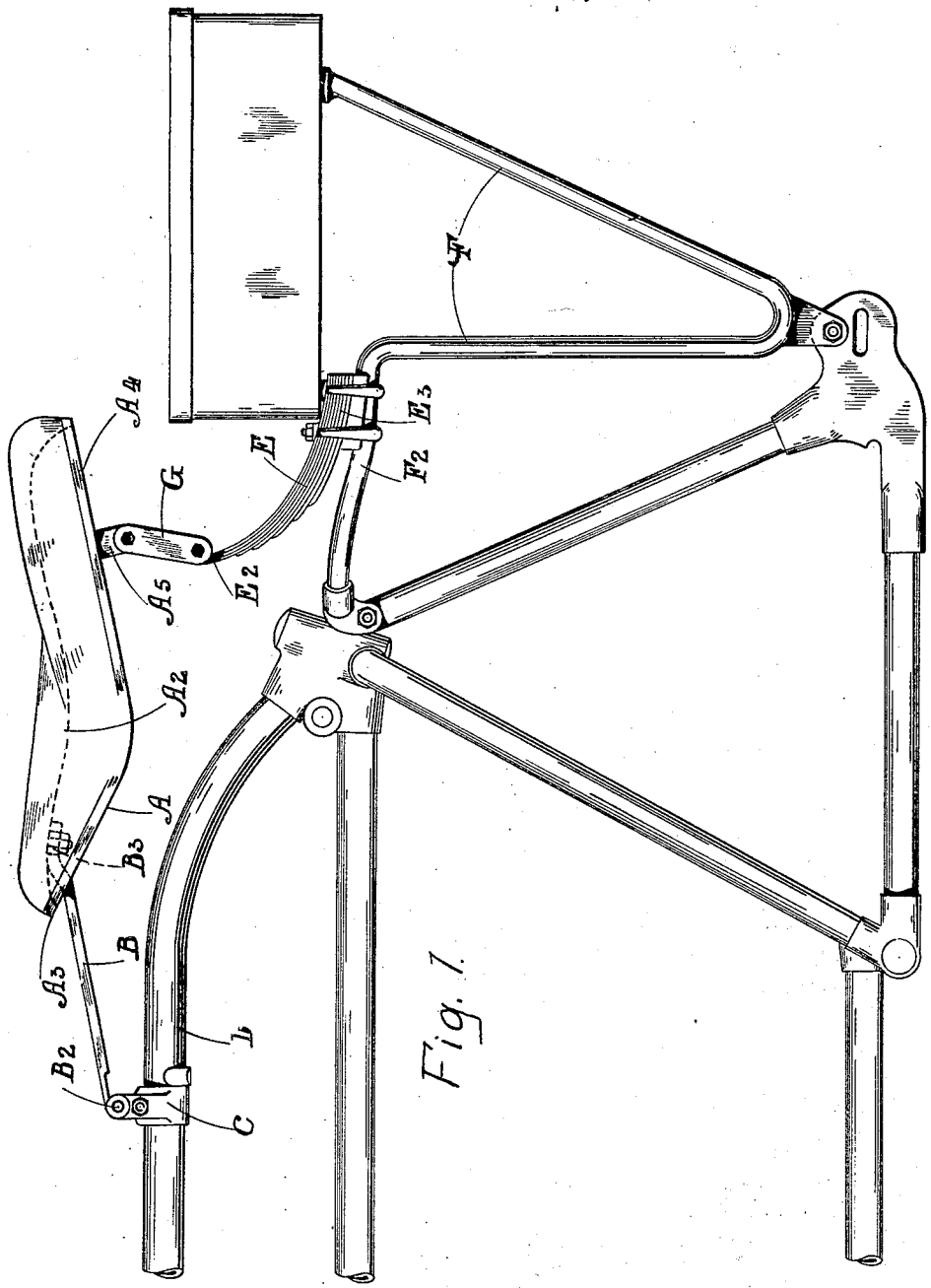

Patented July 29, 1924.

1,502,975

UNITED STATES PATENT OFFICE.

STEPHEN LESLIE BAILEY, OF BRISTOL, ENGLAND.

SADDLE.

Application filed September 19, 1922. Serial No. 589,055.

*To all whom it may concern:*

Be it known that I, STEPHEN LESLIE BAILEY, a subject of the King of England, residing at Bristol, in the county of Gloucester, England, have invented certain new and useful Improvements in Saddles, of which the following is a specification.

This invention relates to saddles for use on motor cycles and the like, of the kind in which the saddle pan is supported at the rear by leaf springs secured at their other ends to the cycle frame, and it has for its object to provide a suspension for the front part of the pan which will be of a simple and effective nature.

According to this invention, the front of the saddle pan is supported by a leaf spring which at one end is secured to the front of the pan and at the other end is pivoted to the cycle frame.

The manner of carrying out the invention is illustrated in the accompanying drawing in which Fig. 1 shows the saddle in side elevation and also adjacent parts of a motor cycle frame and the connections of the saddle therewith, and Figs. 2 and 3 are views similar to Fig. 1, but showing slight modifications.

The pan A of the saddle consists, as usual, of sheet metal covered with leather $A^2$ forming the seat, and to the underside of the peak portion $A^3$ is bolted at $B^3$ a leaf spring B which projects forwards and has its front end pivotally attached at $B^2$ to an adjustable clip C on the top tube D of the frame of the cycle. At the place where the spring B is attached to the pan A, as at $B^3$, the end of the spring is slotted to provide for its adjustment relative to the pan A.

Each rear corner $A^4$ of the pan is supported by the thin end $E^2$ of a laminated spring arm E, the thick end of which is bolted or otherwise attached at $E^3$ to the stays $F^2$ of the luggage carrier F over the rear wheel (not shown). These spring arms E may extend forwards horizontally, then up and backwards in the form of a C as shown in Fig. 2 and the backwardly projecting ends may then be bolted directly to the corners $A^4$ of the pan A. In such a case the ends of all the springs would preferably be slotted at their attachment to the pan, (as shown for example at $B^3$ on the spring B), and the bolts would pass through these slots, allowing the pan to be adjusted longitudinally on the springs, or any equivalent means of adjustment may be used.

Preferably, however, instead of attaching the ends of the springs E directly to the pan, shackles G are employed and are hinged respectively to the end $E^2$ of the spring E and to lugs $A^5$ under the corners of the pan. Such an arrangement permits of the longitudinal movement of the saddle bodily, merely by adjusting the clip C along the top tube D.

If preferred, instead of the shackles G, coiled springs H may be interposed between the pan and the ends $E^2$ of the springs E.

Thus a neat and inexpensive support is provided which permits of considerable vertical movement and also endwise adjustment of the pan.

What I claim as my invention and desire to secure by Letters Patent of the United States is:—

1. A saddle for a vehicle comprising in combination with the vehicle frame, a seat, a pan supporting the same, a leaf spring adjustably secured at its one end to the front part of the said pan and at its other end pivotally connected with the said vehicle frame, a laminated spring arm detachably secured to the said vehicle frame and adapted to resiliently support with its free end the rear end of the said pan, and a means for permitting relative movement between the free end of the said spring arm and the said pan.

2. A saddle for a vehicle, comprising a seat, a pan supporting said seat, a laminated spring arm attached to the vehicle adapted to support the rear part of said pan, and a leaf spring adjustably secured at one end to the front part of said pan and at its other end pivotally connected with a lug which is longitudinally adjustable along the vehicle frame.

3. A saddle for a vehicle, comprising a seat, a pan supporting said seat, a laminated spring arm attached to the vehicle adapted to support the rear part of said pan so as to permit of its adjustment longitudinally of the vehicle, and a leaf spring secured at one end to the front part of said pan and longitudinally adjustable thereto, and at its other end pivotally connected with an adjustable part on the vehicle frame.

In testimony whereof I have signed my name to this specification in the presence of two subscribing witnesses.

STEPHEN LESLIE BAILEY.

Witnesses:
H. M. VINCENT,
R. F. PALMER.